US010798559B1

(12) United States Patent
Chung et al.

(10) Patent No.: US 10,798,559 B1
(45) Date of Patent: Oct. 6, 2020

(54) COLLECTING CONFIGURATION INFORMATION OF SUBSCRIBER DEVICES OF A POINT-TO-MULTIPOINT COMMUNICATION SYSTEM

(71) Applicant: CSC Holdings, LLC, Bethpage, NY (US)

(72) Inventors: Bryn Chung, Setauket, NY (US); Spiros Gounaropoulos, Ronkonkoma, NY (US); Lloyd Means, Baldwin, NY (US)

(73) Assignee: CSC Holdings, LLC, Bethpage, NY (US)

( * ) Notice: Subject to any disclaimer, the term of this patent is extended or adjusted under 35 U.S.C. 154(b) by 100 days.

(21) Appl. No.: 15/258,070

(22) Filed: Sep. 7, 2016

(51) Int. Cl.
*H04W 76/10* (2018.01)
*H04W 8/18* (2009.01)
*H04W 8/24* (2009.01)
*H04W 88/02* (2009.01)

(52) U.S. Cl.
CPC ............ *H04W 8/183* (2013.01); *H04W 8/24* (2013.01); *H04W 76/10* (2018.02); *H04W 88/02* (2013.01)

(58) Field of Classification Search
CPC .............. H04L 29/06; H04L 29/08072; H04L 29/08981; H04L 41/0806; H04L 41/12; H04W 8/183; H04W 76/10; H04W 8/24; H04W 88/02; H04W 8/18
USPC ................. 709/220, 228; 340/16.1; 710/104; 713/1; 717/11
See application file for complete search history.

(56) References Cited

U.S. PATENT DOCUMENTS

| 6,499,036 | B1* | 12/2002 | Gurevich | G06F 9/542 707/778 |
| 7,240,364 | B1* | 7/2007 | Branscomb | H04L 29/12113 726/5 |
| 2005/0044215 | A1* | 2/2005 | Cohen | H04L 43/12 709/224 |
| 2012/0203742 | A1* | 8/2012 | Goodman | G06F 16/122 707/646 |
| 2012/0257527 | A1* | 10/2012 | Jorgensen | H04W 28/20 370/252 |
| 2014/0359108 | A1* | 12/2014 | Gokhale | H04L 41/0856 709/224 |
| 2017/0147238 | A1* | 5/2017 | Dumov | G06F 12/0246 |

* cited by examiner

*Primary Examiner* — Tonia L Dollinger
*Assistant Examiner* — Mehulkumar J Shah
(74) *Attorney, Agent, or Firm* — Sterne, Kessler, Goldstein & Fox P.L.L.C.

(57) ABSTRACT

A remote querying system and a service provider repository system functionally cooperate to efficiently store configuration information of one or more subscriber devices within the service provider repository system. The remote querying system receives the configuration information of the one or more subscriber devices from a service provider system. Thereafter, the remote querying system determines differences between this received configuration information and configuration information that is previously stored in the service provider repository system. Next, the remote querying system communicates these differences to the service provider repository system to allow the service provider repository system to update the previously stored configuration information.

16 Claims, 3 Drawing Sheets

COLLECTING CONFIGURATION INFORMATION OF SUBSCRIBER DEVICES OF A POINT-TO-MULTIPOINT COMMUNICATION SYSTEM

BACKGROUND

A conventional service provider system of a conventional point-to-multipoint communication system provides a service, such as communication of video, audio, and/or data to provide some examples, to one or more subscriber devices of the service. The conventional point-to-multipoint communication system often includes a conventional service provider repository system to store configuration information of the one or more subscriber devices. In some situations, the conventional service provider repository system can service multiple conventional service provider systems, for example between forty eight and sixty conventional service provider systems, each of these multiple service provider systems servicing multiple conventional subscriber devices, for example hundreds or thousands of conventional subscriber devices. In some situations, having up-to-date and near real-time information for this the shear amount of configuration information provided by these service provider systems can overwhelm the conventional service provider repository system.

BRIEF DESCRIPTION OF THE DRAWINGS/FIGURES

The present disclosure is described with reference to the accompanying drawings. In the drawings, like reference numbers indicate identical or functionally similar elements. Additionally, the left most digit(s) of a reference number identifies the drawing in which the reference number first appears. In the accompanying drawings.

The present disclosure will now be described with reference to the accompanying drawings.

DETAILED DESCRIPTION OF THE DISCLOSURE

Overview

A remote querying system and a service provider repository system functionally cooperate to efficiently store configuration information of one or more subscriber devices within the service provider repository system. The remote querying system receives the configuration information of the one or more subscriber devices from a service provider system. Thereafter, the remote querying system determines differences between this received configuration information and configuration information that is previously stored in the service provider repository system. Next, the remote querying system communicates these differences to the service provider repository system to allow the service provider repository system to update the previously stored configuration information.

Exemplary Point-to-Multipoint Communication System

Figure 1:
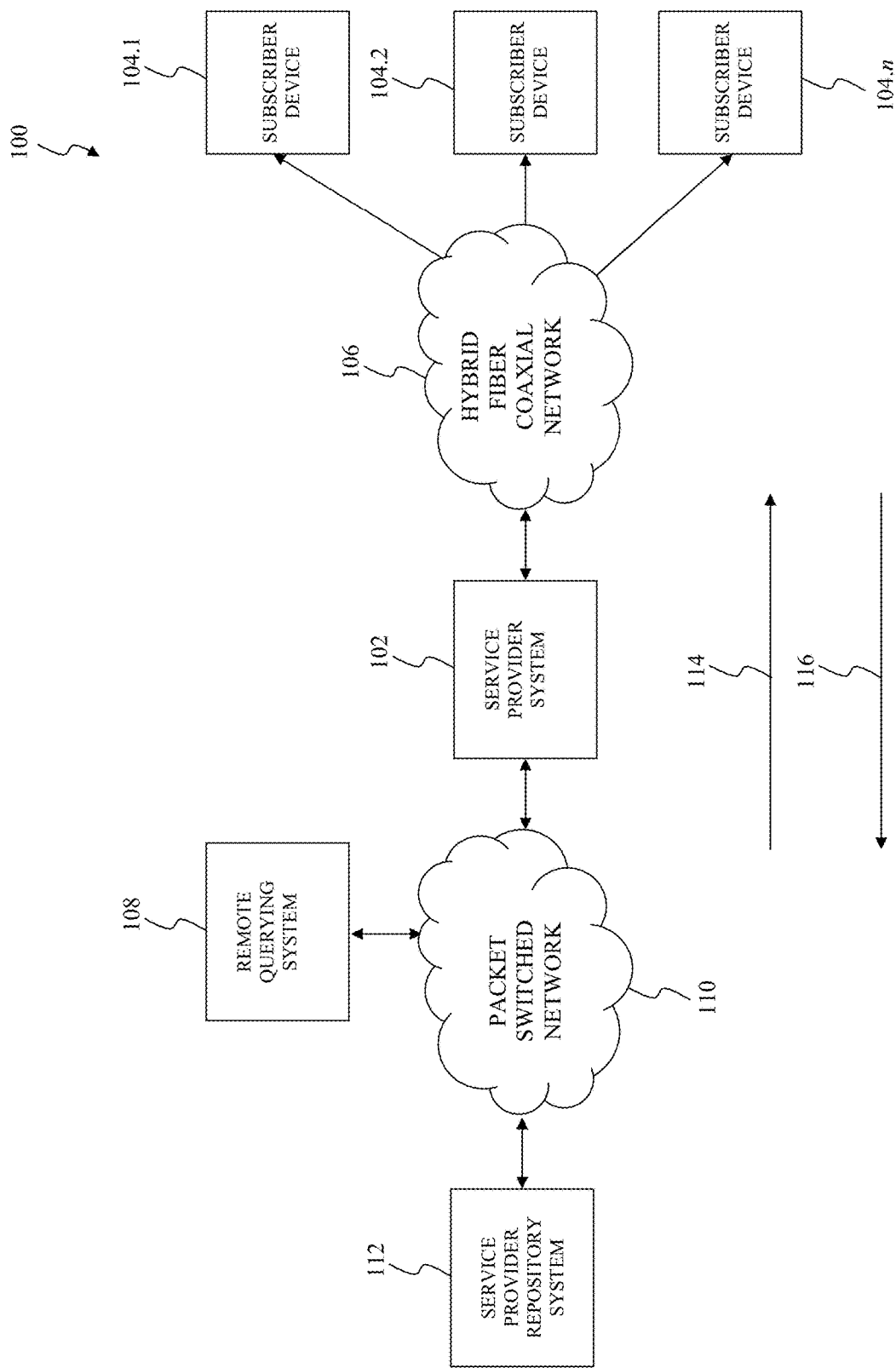
FIG. 1 illustrates a block diagram of an exemplary point-to-multipoint communication system according to an embodiment of the present disclosure.

FIG. 1 illustrates a block diagram of an exemplary point-to-multipoint communication system according to an embodiment of the present disclosure. A communication system 100 facilitates bi-directional communication of information, such as video, audio, and/or data to provide some examples, between a service provider system 102 and subscriber devices 104.1 through 104.n. It can be beneficial for a provider of a service to record configuration information of subscribing devices of the service to allow the information to be more efficiently communicated between the service provider system 102 and the subscriber devices 104.1 through 104.n. As used herein, the term "downstream direction 114" refers to the transfer of information in a first direction from the service provider system 102 to the subscriber devices 104.1 through 104.n. The term "upstream direction 116" refers to the transfer of information in a second direction from the subscriber devices 104.1 through 104.n to the service provider system 102. As illustrated in FIG. 1, the communication system 100 includes the service provider system 102, the subscriber devices 104.1 through 104.n, a hybrid fiber coaxial (HFC) network 106, a remote querying system 108, a packet switched network 110, and a service provider repository system 112.

As illustrated in FIG. 1, the service provider system 102 communicates one or more polling messages to the subscriber devices 104.1 through 104.n over the HFC network 106 in the downstream direction 114. The service provider system 102 can communicate the one or more polling messages at period intervals, non-periodic intervals, and/or in response to an event, such as one or more commands from the remote querying system 108 to provide an example. The HFC network 106 provides a point-to-multipoint topology for the high speed, reliable, and secure transport of information between the service provider system 102 and the subscriber devices 104.1 through 104.n. As will be appreciated by those skilled in the relevant art(s), the HFC network 106 may include coaxial cable, fiber optic cable, or a combination of coaxial cable and fiber optic cable linked via one or more fiber nodes, and may include frequency translation devices in support of a frequency stacking architecture, and may even include wireless links without departing from the spirit and scope of the present disclosure. In an exemplary embodiment, the service provider system 102 can be implemented as a cable modem termination system (CMTS) of a cable communication system, as an optical line terminal (OLT) of a Passive Optical Network (PON), or as any other suitable centralized entity in a point-to-multipoint communication system that will be apparent to those skilled in the relevant art(s) without departing from the spirit and scope of the present disclosure.

The one or more polling messages represent one or more requests by the service provider system 102 for configuration information from the subscriber devices 104.1 through 104.n. This configuration information can include state configuration information relating to a class of service, such as a class identifier (ID), a maximum downstream rate, a maximum upstream rate, an upstream channel priority, a guaranteed minimum upstream rate, a maximum upstream transmit burst, a timing offset, and/or a frequency offset to provide some examples, vendor specific information such as a vendor ID to provide an example, networking protocol information, such as a Simple Network Management Protocol (SNMP) manager Internet Protocol (IP) address, a SNMP write-access, or a SNMP Management Information Bases (MIB) object, service provider name, login username, login password, Dynamic Host Configuration Protocol (DHCP) authentication, DHCP server IP address, media access control (MAC) address to provide some examples, and/or any other suitable configuration information for the subscriber devices 104.1 through 104.$n$ that will be apparent to those skilled in the relevant art(s) without departing from the spirit and scope of the present disclosure.

The subscriber devices 104.1 through 104.$n$ provide one or more polling responses in response to the one or more polling commands to the service provider system 102 over the HFC network 106 in the upstream direction 116. The one or more polling messages represent one or more responses by the subscriber devices 104.1 through 104.$n$ for the configuration information. In an exemplary embodiment, the subscriber devices 104.1 through 104.$n$ can store the configuration information in one or more configuration files that are accessible by the service provider system 102 through the one or more polling messages. The one or more configuration files can be stored within a volatile memory, such as random access memory (RAM), which requires power to maintain its stored information and/or non-volatile memory, such as read-only memory (ROM), which can maintain its stored information even when not powered. The RAM can be implemented in a dynamic random-access memory (DRAM), a static random-access memory (SRAM), and/or a non-volatile random-access memory (NVRAM), often referred to as a flash memory, configuration to provide some examples.

The service provider system 102 stores the configuration information in one or more configuration files that are accessible by the remote querying system 108 through one or more polling messages for delivery to the service provider repository system 112 over the packet switched network. However, those skilled in the relevant art(s) will recognize that the remote querying system 108 and/or the service provider repository system 112 can be implemented within or as part of the service provider system 102 without departing from the spirit and scope of the present disclosure. Generally, the packet switched network 110 represents a communication network that groups data into specialized blocks, often referred to as packets. For example, the packet switched network 110 can represent a global system of interconnected computer networks that use the Internet protocol suite (TCP/IP), namely the Internet. The one or more configuration files can be stored by the service provider system 102 within a volatile memory, such as RAM, and/or non-volatile memory, such as ROM. The RAM can be implemented in a DRAM, a SRAM, and/or a NVRAM configuration to provide some examples.

The remote querying system 108 operates as a gateway between the service provider system 102 and the service provider repository system 112. A conventional service provider repository system can service multiple conventional service provider systems, for example between forty eight and sixty conventional service provider systems, each of these multiple service provider systems servicing multiple conventional subscriber devices, for example hundreds or thousands of conventional subscriber devices. If these multiple conventional service provider systems were to provide configuration information of the multiple conventional subscriber devices directly to the conventional service provider repository system, the shear amount of up-to-date and near real-time information configuration information can overwhelm the conventional service provider repository system. In contrast, the remote querying system 108 operates as the gateway between the service provider system 102 and the service provider repository system 112 to efficiently communicate the configuration information between the service provider system 102 and the service provider repository system 112.

The remote querying system 108 communicates one or more query messages over the packet switched network 110 to the service provider system 102 over the packet switched network. The one or more query messages represent one or more requests by the remote querying system 108 for configuration information of the subscriber devices 104.1 through 104.$n$ from the service provider system 102. The one or more query messages can request all, or a subset, of the configuration information of the subscriber devices 104.1 through 104.$n$ from the service provider system 102 or all, or a subset, of the configuration information of a subset of the subscriber devices 104.1 through 104.$n$ from the service provider system 102. The remote querying system 108 can communicate the one or more query messages at period intervals, non-periodic intervals, and/or in response to an event, such as one or more commands from the service provider repository system 112 to provide an example.

Thereafter, the remote querying system 108 receives one or more query responses over the packet switched network 110 in response to the one or more query commands from the service provider system 102 with the configuration information of the subscriber devices 104.1 through 104.$n$. In an exemplary embodiment, the remote querying system 108 stores the configuration information as text files within a volatile memory, such as RAM, and/or non-volatile memory, such as ROM. The RAM can be implemented in a DRAM, a SRAM, and/or a NVRAM configuration to provide some examples. The text files can represent human-readable text files, such as plain text files or rich text files to provide some examples, machine readable text files, such as binary files to provide an example, and/or any other structured sequence of lines of electronic information that will be apparent to those skilled in the relevant art(s) without departing from the spirit and scope of the present disclosure. In this exemplary embodiment, by storing the configuration information as the text files, the remote querying system 108 eliminates much of the overhead that would be needed if the configuration information were to be stored in one or more databases.

Next, the remote querying system 108 communicates differences between the configuration information received from the service provider system 102 and configuration information of the subscriber devices 104.1 through 104.$n$ previously stored in the service provider repository system 112. In an exemplary embodiment, the remote querying system 108 can compare the configuration information received from the service provider system 102 with configuration information previously stored within the remote querying system 108 and send differences between these configuration information to the service provider repository system 112 over the packet switched network 110. In another exemplary embodiment, the remote querying system 108 can synchronize the configuration information received from the service provider system 102 with configuration information previously stored in the service provider repository system 112. In this other exemplary embodiment, the remote querying system 108 can utilize a utility, such as a remote synchronization (RSYNC) utility to provide an example, which accesses the configuration information previously stored in the service provider repository system 112. This utility invokes a second utility in the service provider repository system 112, such an RSYNC utility executing on the service provider repository system 112 to provide an example, and then these utilities functionally cooperate to determine differences between the configuration information received from the service provider system 102 with the configuration information previously stored in the service provider repository system 112 that need to be communicated from the remote querying system 108 to the service provider repository system 112. Thereafter, in this other exemplary embodiment, the remote querying system 108 sends the differences between these configuration information to the service provider repository system 112 over the packet switched network 110.

The service provider repository system 112 receives the differences between the configuration information received from the service provider system 102 with the configuration information previously stored in the service provider repository system 112. Thereafter, the service provider repository system 112 updates the configuration information previously stored in the service provider repository system 112 based upon these differences. This updating can include replacing the differences in the configuration information previously stored in the service provider repository system 112, deleting the differences in the configuration information previously stored in the service provider repository system 112, and/or inserting the differences in the configuration information previously stored in the service provider repository system 112. In an exemplary embodiment, the service provider repository system 112 stores the configuration information received from the service provider system 102 in one or more databases. In this exemplary embodiment, the service provider repository system 112 updates the one or more databases based upon the differences.

Figure 2:
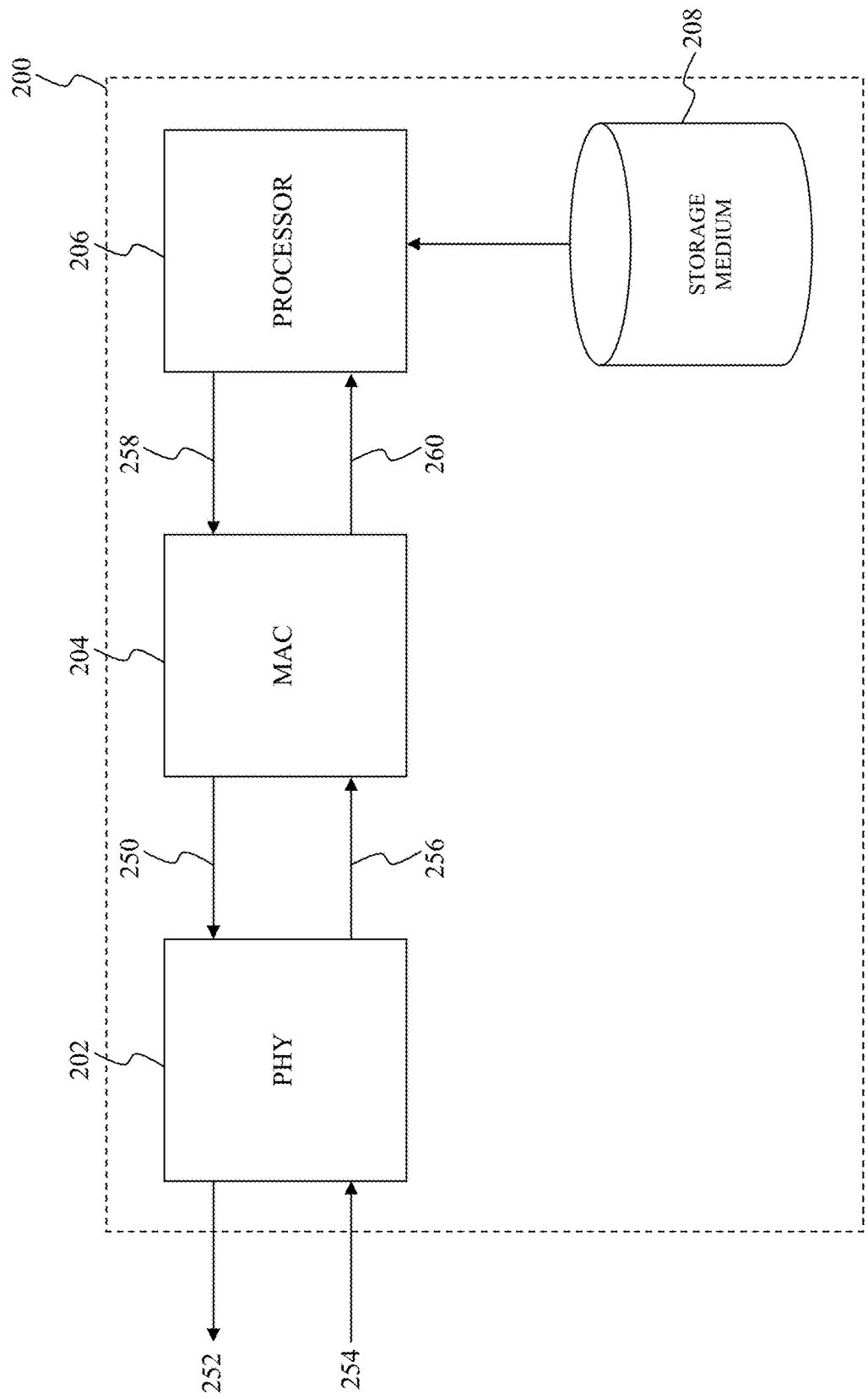
FIG. 2 illustrates a block diagram of an exemplary remote querying system of the exemplary point-to-multipoint communication system according to an embodiment of the present disclosure.

Exemplary Remote Querying System of the Point-to-Multipoint Communication System FIG. 2 illustrates a block diagram of an exemplary remote querying system of the exemplary point-to-multipoint communication system according to an embodiment of the present disclosure. A remote querying system 200 queries a service provider system, such as the service provider system 102 to provide an example, for configuration information of one or more subscriber devices, such as one or more of subscriber devices 104.1 through 104.n, to provide an example. Thereafter, the remote querying system 200 sends differences between this configuration information and configuration information previously stored in a service provider repository system, such as the service provider repository system 112 to provide an example, to allow the service provider repository system to update the configuration information previously stored in the service provider repository system based upon these differences. As illustrated in FIG. 2, the remote querying system 200 includes physical layer (PHY) circuitry 202, media access controller (MAC) circuitry 204, processor circuitry 206, and a storage medium 208. The remote querying system 200 can represent an exemplary embodiment of the remote querying system 108.

The PHY circuitry 202 represents an interface between a communication network, such as the packet switched network 110 to provide an example, and the MAC circuitry 204. Generally, the PHY circuitry 202 modulates, encodes, and/or converts an information frame 250 to provide an information signal 252 for transmission to the communication network. The information frame 250 and/or the information signal 252 can include the one or more query messages, as discussed in FIG. 1, representing one or more requests by the remote querying system 200 for configuration information of the one or more subscriber devices from the service provider system. The one or more query messages can request all, or a subset, of the configuration information of the one or more subscriber devices. The configuration information can include state configuration information relating to a class of service, such as a class identifier (ID), a maximum downstream rate, a maximum upstream rate, an upstream channel priority, a guaranteed minimum upstream rate, a maximum upstream transmit burst, a timing offset, and/or a frequency offset to provide some examples, vendor specific information such as a vendor ID to provide an example, networking protocol information, such as a Simple Network Management Protocol (SNMP) manager Internet Protocol (IP) address, a SNMP write-access, or a SNMP Management Information Bases (MIB) object, service provider name, login username, login password, Dynamic Host Configuration Protocol (DHCP) authentication, DHCP server IP address, media access control (MAC) address to provide some examples, and/or any other suitable configuration information for the one or more subscriber devices that will be apparent to those skilled in the relevant art(s) without departing from the spirit and scope of the present disclosure. Additionally, the PHY circuitry 202 demodulates, decodes, and/or converts an information signal 254 received over the communication network to provide an information frame 256. The information signal 254 and/or the information frame 256 can include one or more query responses with the configuration information of the one or more subscriber devices as discussed in FIG. 1.

The MAC circuitry 204 represents an interface between the PHY circuitry 202 and the processor circuitry 206. The MAC circuitry 204 manages and maintains communication of the remote querying system 200 by coordinating access to the communication network and formatting communications in accordance with one or more communication standards or protocols that are supported by the remote querying system 200. As illustrated in FIG. 2, the MAC circuitry 204 encapsulates or frames a sequence of bits 258 to provide a payload portion of the information frame 250 and appends a preamble portion of the information frame 250 to the payload portion in accordance with the one or more communication standards or protocols to the provide the information frame 250. Otherwise, the MAC circuitry 204 decapsulates or de-frames the information frame 256 in accordance with the one or more communication standards or protocols to provide a payload portion of the information frame 256 as sequence of bits 260. The MAC circuitry 204 can, optionally, authenticate and/or authorize the information frame 256 before decapsulating or de-framing.

The processor circuitry 206 controls overall operation and/or configuration of the remote querying system 200. For example, the processor circuitry 206 stores the configuration information of the sequence of bits 260 as one or more text files in the storage medium 208 as discussed in FIG. 1. The text files can represent human-readable text, such as plain text or rich text to provide some examples, machine readable text, such as a binary file to provide an example, and/or any other structured sequence of lines of electronic information that will be apparent to those skilled in the relevant art(s) without departing from the spirit and scope of the present disclosure. Contemporaneous with the storage of the configuration information, the processor circuitry 206 monitors the one or more text files stored in the storage medium 208. Once the processor circuitry 206 has determined that all of the configuration information has been stored in the storage medium 208 by receiving one or more notifications from the storage medium 208 that the one or more text files have been closed, the processor circuitry 206 executes a utility, such as an RSYNC utility to provide an example, which accesses the configuration information previously stored in the service provider repository system. This triggering event allows for the asynchronous transfer of the configuration information from the remote querying system 200 to the service provider repository system. Next, the utility executing on the processor circuitry 206 causes the processor circuitry 206 to issue one or more commands to cause the service provider repository system to invoke a second utility in the service provider repository system, such an RSYNC utility executing on the service provider repository system to provide an example. The one or more commands are communicated to the service provider repository system using the PHY circuitry 202 and the MAC circuitry 204 as discussed above. Thereafter, these utilities functionally cooperate to determine differences between the configuration information stored in the storage medium 208 with the configuration information previously stored in the service provider repository system that need to be communicated to the service provider repository system. Finally, the processor circuitry 206 communicates differences between the configuration information stored in the storage medium 208 and configuration information of the one or more subscriber devices previously stored in the service provider repository system.

The storage medium 208 stores the configuration information of the one or more subscriber devices received from the service provider system. In an exemplary embodiment, the storage medium 208 stores the configuration information as text files within a volatile memory, such as random access memory (RAM), and/or non-volatile memory, such as read-only memory (ROM). The RAM can be implemented in dynamic random-access memory (DRAM), a static random-access memory (SRAM), and/or a non-volatile random-access memory (NVRAM) configuration to provide some examples.

Figure 3:
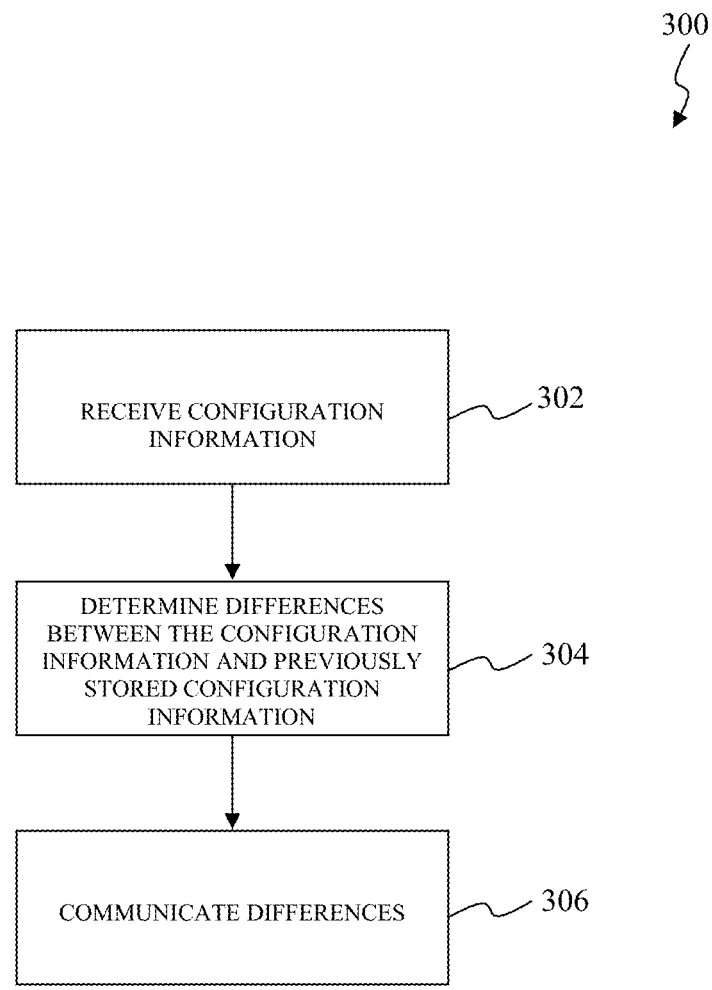
FIG. 3 is a flowchart of exemplary operational steps of processor circuitry of the remote querying system according to an embodiment of the present disclosure.

Exemplary Operational Steps of Processor Circuitry of the Remote Querying System FIG. 3 is a flowchart of exemplary operational steps of processor circuitry of the remote querying system according to an embodiment of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 300 of processor circuitry, such as the processor circuitry 206 to provide an example, of a remote querying system, such as the remote querying system 108 or the remote querying system 200 to provide some examples. It should be noted that the various steps of the operational control flow 300 need not be performed in the order as described. Rather, those skilled in the relevant art(s) will recognize that other ordering of the steps are possible without departing from the spirit and scope of the present disclosure.

At step 302, the operational flow control 300 receives configuration information of one or more subscriber devices, such as one or more of subscriber devices 104.1 through 104.n, to provide an example. The configuration information can include state configuration information relating to a class of service, such as a class identifier (ID), a maximum downstream rate, a maximum upstream rate, an upstream channel priority, a guaranteed minimum upstream rate, a maximum upstream transmit burst, a timing offset, and/or a frequency offset to provide some examples, vendor specific information such as a vendor ID to provide an example, networking protocol information, such as a Simple Network Management Protocol (SNMP) manager Internet Protocol (IP) address, a SNMP write-access, or a SNMP Management Information Bases (MIB) object, service provider name, login username, login password, Dynamic Host Configuration Protocol (DHCP) authentication, DHCP server IP address, media access control (MAC) address to provide some examples, and/or any other suitable configuration information for the one or more subscriber devices that will be apparent to those skilled in the relevant art(s) without departing from the spirit and scope of the present disclosure.

At step 304, the operational flow control 300 determines differences between the configuration information of step 302 and configuration information that has been previously stored within a service provider repository system, such as the service provider repository system to provide an example. The operational flow control 300 can synchronize the configuration information of step 302 with the configuration information that has been previously stored within the service provider repository system. For example, the operational flow control 300 can utilize a utility, such as an RSYNC utility to provide an example, which accesses the configuration information that has been previously stored within the service provider repository system. In an exemplary embodiment, the operational flow control 300 executes the utility in response to receiving one or more notifications that the configuration information of step 302 has been stored in its entirety. For example, the one or more notifications can include a write-close event notification from a storage medium, such as the storage medium 208 to provide an example, indicating that the configuration information of step 302 has been written into one or more text files and these one or more files have been closed. This utility invokes a second utility in the service provider repository system, such an RSYNC utility executing on the service provider repository system to provide an example, and then these utilities functionally cooperate to determine differences between the configuration information of step 302 with the configuration information that has been previously stored within the service provider repository system.

At step 306, the operational flow control 300 communicates the differences of step 304 to the service provider repository system to allow the service provider repository system to update the configuration information that has been previously stored.

CONCLUSION

Although the embodiments of the disclosure described herein refer specifically, and by way of example, to cable modem systems, including cable modem termination systems and cable modems, it will be readily apparent to those skilled in the relevant art(s) that the disclosure is equally applicable to satellite systems, optical communication systems, telephone wire systems, home network systems, and/or any combination thereof. It will be readily apparent to those skilled in the relevant art(s) that the disclosure is applicable to any point-to-multipoint system.

The Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to limiting. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes, and are not intend to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software, routines, instructions can be described herein as performing certain actions. However, it should be appreciated that such descriptions are merely for convenience and that such actions in fact result from computing devices, processors, controllers, or other devices executing the firmware, software, routines, instructions, etc.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A method for storing configuration information of a subscriber device of a point-to-multipoint communication system in a service provider repository system of the point-to-multipoint communication system, the method comprising:

sending, by a remote querying system of the point-to-multipoint communication system, a query message to a service provider system communicatively coupled to the remote querying system, the query message representing a request by the remote querying system for the configuration information of the subscriber device;

receiving, by the remote querying system, a response to the query message from the service provider system, the response including the configuration information of the subscriber device;

storing, by the remote querying system, the configuration information of the subscriber device;

utilizing, by the remote querying system, a first utility to access the stored configuration information of the subscriber device;

invoking, by the remote querying system, a second utility executing on a service provider repository system communicatively coupled to the remote querying system to access previously stored configuration information of the subscriber device previously stored in the service provider repository system;

functionally cooperating, by the first utility utilized by the remote querying system, with the second utility to determine a difference between the stored configuration information of the subscriber device and the previously stored configuration information of the subscriber device; and communicating, by the remote querying system, the difference to the service provider repository system to allow the service provider repository system to update the previously stored configuration information of the subscriber device.

2. The method of claim 1, wherein the configuration information of the subscriber device comprises:
state configuration information relating to a class of service of the subscriber device; or
state configuration information relating to networking protocol information of the subscriber device.

3. The method of claim 1, wherein the storing comprises:
storing the configuration information of the subscriber device as one or more text files.

4. The method of claim 3, wherein the one or more text files comprise:
one or more human-readable text files; or
one or more machine-readable text files.

5. The method of claim 1, wherein the first utility and the second utility comprise:
a remote synchronization (RSYNC) utility.

6. The method of claim 1, further comprising:
monitoring, by the remote querying system, the configuration information of the subscriber device as the configuration information of the subscriber device is being stored in the remote querying system; and
wherein the executing comprises:
executing the first utility once all of the configuration information of the subscriber device has been stored in the remote querying system.

7. A remote querying system of a point-to-multipoint communication system, comprising:
physical layer (PHY) circuitry configured to:
send a query message to a service provider system communicatively coupled to the remote querying system, the query message representing a request by the remote querying system for configuration information of a subscriber device of the point-to-multipoint communication system, and receive a response to the query message from the service provider system, the response including the configuration information of the subscriber device;

a storage medium configured to store the configuration information of the subscriber device;

processor circuitry configured to:

utilize a first utility to access the configuration information of the subscriber device stored in the storage medium, and invoke a second utility executing on a service provider repository system communicatively coupled to the remote querying system to access previously stored configuration information of the subscriber device previously stored in the service provider repository system, wherein the first utility and the second utility functionally cooperate to determine a difference between the configuration information of the subscriber device stored in the storage medium and the previously stored configuration information of the subscriber device, and wherein the PHY circuitry is further configured to communicate the difference to the service provider repository system to allow the service provider repository system to update the previously stored configuration information of the subscriber device.

8. The remote querying system of claim 7, wherein the configuration information of the subscriber device comprises:

state configuration information relating to a class of service of the subscriber device; or state configuration information relating to networking protocol information of the subscriber device.

9. The remote querying system of claim 7, wherein the storage medium stores the configuration information of the subscriber device as one or more text files.

10. The remote querying system of claim 9, wherein the one or more text files comprise:

one or more human-readable text files; or one or more machine-readable text files.

11. The remote querying system of claim 7, wherein the first utility and the second utility comprise:

a remote synchronization (RSYNC) utility.

12. The remote querying system of claim 7, wherein the processor circuitry is further configured to:

monitor the configuration information of the subscriber device as the configuration information of the subscriber device is being stored in the storage medium; and execute the first utility once all of the configuration information of the subscriber device has been stored in the storage medium.

13. A remote querying system of a point-to-multipoint communication system, comprising:

physical layer (PHY) circuitry configured to:

send a query message to a service provider system communicatively coupled to the remote querying system, the query message representing a request by the remote querying system for configuration information of a subscriber device of the point-to-multipoint communication system, and receive a response to the query message from the service provider system, the response including the configuration information of the subscriber device; and processor circuitry configured to:

monitor storage of the configuration information of the subscriber device in a storage medium, execute a first utility to access the configuration information of the subscriber device stored in the storage medium once all of the configuration information of the subscriber device has been stored in the storage medium, and invoke a second utility executing on a service provider repository system communicatively coupled to the remote querying system to access previously stored configuration information of the subscriber device previously stored in the service provider repository system, wherein the first utility functionally cooperates with the second utility to determine a difference between the configuration information of the subscriber device and the previously stored configuration information of the subscriber device, and wherein the PHY circuitry is further configured to communicate the difference to the service provider repository system to allow the service provider repository system to update the previously stored configuration information of the subscriber device.

14. The remote querying system of claim 13, wherein the processor circuitry is further configured to store the configuration information of the subscriber device in the storage medium as one or more text files.

15. The remote querying system of claim 14, wherein the processor circuitry is configured to execute the first utility once the one or more text files have been closed.

16. The remote querying system of claim 13, wherein the first utility and the second utility comprise:

a remote synchronization (RSYNC) utility.

* * * * *